United States Patent [19]

Mels et al.

[11] 4,444,955
[45] Apr. 24, 1984

[54] WATER REDUCIBLE QUATERNARY AMMONIUM SALT CONTAINING POLYMERS

[75] Inventors: Sherman J. Mels, Oak Forest; Brian C. Petrie, Chicago; Richard J. Pokusa, Crestwood, all of Ill.

[73] Assignee: The Sherwin-Williams Company, Cleveland, Ohio

[21] Appl. No.: 431,995

[22] Filed: Sep. 30, 1982

[51] Int. Cl.³ .................... C08L 75/08; C08L 33/12
[52] U.S. Cl. ........................... 525/124; 204/181 C; 524/555; 524/901; 525/130; 525/328.2; 525/328.3; 525/328.4
[58] Field of Search ............... 524/555, 901, ; 525/124, 328.2, 328.4, 328.3; 204/181 C

[56] References Cited

U.S. PATENT DOCUMENTS

| | | | |
|---|---|---|---|
| 3,417,003 | 12/1968 | Ross et al. | 204/14 |
| 3,719,626 | 3/1973 | May | 260/29.2 EP |
| 3,773,729 | 11/1973 | Hyogo et al. | 260/77.5 TB |
| 3,839,252 | 10/1974 | Bosso et al. | 260/29.2 EP |
| 3,928,156 | 12/1975 | Wismer et al. | 204/181 |
| 3,935,087 | 1/1976 | Jerabek et al. | 204/181 |
| 3,962,165 | 6/1976 | Bosso et al. | 260/29.2 EP |
| 4,040,924 | 8/1977 | Jones | 204/181 |
| 4,071,428 | 1/1978 | Bosso et al. | 204/181 |
| 4,101,486 | 7/1978 | Bosso et al. | 260/29.2 TN |
| 4,310,398 | 1/1982 | Gimpel et al. | 524/555 |
| 4,311,805 | 1/1982 | Moritani et al. | 524/555 |

OTHER PUBLICATIONS

*Sipomer Q-6-75 Cationic Methacrylate Monomer* brochure by Alcolac, Inc., 9/79.
*Sipomer Q5-80 Cationic Methacrylate Monomer* brochure by Alcolac, Inc. 10/79.
*Cationic Monomers DMAPMA MAPTAC* pp. 1-23 by Texaco Chemical Company.

*Primary Examiner*—Theodore E. Pertilla
*Attorney, Agent, or Firm*—Robert E. McDonald; James V. Tura

[57] ABSTRACT

This invention relates to a water dispersible coating composition which comprises:
 (i) an acrylic polymer having active hydrogen functionality and quaternary ammonium salt functionality; and
 (ii) a blocked polyisocyanate.

The water dispersible coating composition of this invention can be applied by any means known within the coatings art, but is especially suited for use in cathodic electrodeposition.

18 Claims, No Drawings

WATER REDUCIBLE QUATERNARY AMMONIUM SALT CONTAINING POLYMERS

BACKGROUND OF THE INVENTION

1. Field of the Invention.

This invention relates to a water dispersible coating composition which comprises:

(i) an acrylic polymer having active hydrogen functionality and quaternary ammonium salt functionality; and (ii) a blocked polyisocyanate. The water dispersible coating composition of this invention can be applied by any means known within the coatings art, but is especially suited for use in cathodic electrodeposition.

2. Description of the Prior Art.

The use of quaternary ammonium salt containing polymers as water reducible coatings has been known in the art. For example, U.S. Pat. No. 3,935,087 teaches resins prepared by reacting a portion of the hydroxyl groups of a hydroxyl-containing epoxy group-containing organic material with a partially-capped or blocked organic polyisocyanate, followed by reacting at least a portion of the epoxy groups in a manner so as to add pendant quaternary onium salt groups to render the resin water dispersible or solubilized.

U.S. Pat. No. 4,071,428 teaches electrodepositable compositions which comprise the reaction product of a polymeric tertiary amine and a 1,2 epoxy containing material in the presence of acid and/or water to form quaternary ammonium base group-containing polymers. This approach has the drawback that the epoxy could also react with other functional groups on the polymer backbone, such as hydroxyl groups or primary and secondary amine groups.

BRIEF SUMMARY OF THE INVENTION

This invention relates to a water dispersible coating composition which comprises:

(i) an acrylic polymer which comprises the free radical addition product of (a) at least one quaternary ammonium salt containing monomer having the structure:

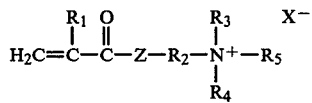

wherein $R_1$ is H or alkyl of 1 to 3 carbons; Z is N—H or O; $R_2$ is a divalent methylene radical $—(CH_2)_n—$, wherein n is an integer from 1 to about 10; $R_3$, $R_4$ and $R_5$ can be the same or different and are alkyl or substituted alkyl, preferably of 1 to about 20 carbons or aryl or substituted aryl, preferably of 6 to about 18 carbons with the proviso that $R_3$, $R_4$ and $R_5$ cannot be hydroxy functional; and $X^-$ is an anion; and (b) at least one active hydrogen functional unsaturated monomer; and (c) at least one other ethylenically unsaturated monomer; and (ii) a blocked polyisocyanate which is stable in the presence of the acrylic polymer at room temperature but reactive with the acrylic polymer at elevated temperatures.

It is especially preferred to have $R_3$, $R_4$ and $R_5$ all lower alkyl of 1 to 4 carbons. Substituted alkyl or aryl groups are those having one or more hydrogen atoms replaced with alkyl, aryl, aroxy, alkoxy or halogen and can contain acyl groups.

The quaternary ammonium salt groups on the acrylic polymer backbone have a catalytic effect providing lower temperature cures with the blocked polyisocyanate.

This invention also relates to a method of electrocoating an electrically conductive surface serving as a cathode in an electrical circuit comprising said cathode, an anode, and an aqueous electrodepositable composition wherein the aqueous electrodepositable composition comprises the coating described above.

Accordingly, it is an object of this invention to provide improved water reducible coatings. It is a further object of this invention to provide water reducible coatings having excellent exterior durability. Another object of this invention is to provide water reducible coatings having excellent low temperature cure response with blocked isocyanates. Another object of this invention is to provide a method of electrocoating an electrically conductive surface. These and other objects of this invention will be apparent from the following discussions.

DETAILED DESCRIPTION OF THE INVENTION

The acrylic polymers useful in the practice of this invention contain one or more active hydrogen containing groups as determined by the Zerewitinoff Method as described by Kohler in J. Am. Chem. Soc, 49, 3181 (1927). Some such suitable compounds are, for example, acrylic polymers having one or more of any of the following types of active hydrogen containing groups, among others, —OH, —NH$_2$, —NH, —CONH—, —COOH, —SH and the like.

The acrylic polymers are prepared by conventional free radical addition polymerization techniques and can use any suitable unsaturated monomers. Methods of producing acrylic polymers are well known and are not a part of the present invention. If desired the free radical polymerization can be catalyzed by conventional catalysts known in the art such as azo, peroxy or redox catalysts. Typically the acrylic polymers are produced by heating the unsaturated monomers at temperatures ranging from about 180° F. to 450° F. and especially 200° F. to about 300° F. to effect the polymerization. It is normally preferred to prepare the acrylic polymers by solution polymerization in organic solvents. Solvents having a solubility of at least about 30 grams per liter of water are preferred. Especially preferred at the glycol ethers and glycol ether esters such as ethylene glycol monoethyl ether, diethylene glycol monobutyl ether, 2-ethoxyethyl acetate etc. If it is desired to achieve a relatively low molecular weight acrylic polymer, a chain transfer agent such as a mercaptan may be employed to achieve this result.

Especially preferred in the practice of this invention is an acrylic polymer which comprises the free radical addition product of (a) from about 1 to about 10% of at least one quaternary ammonium salt containing monomer having the structure:

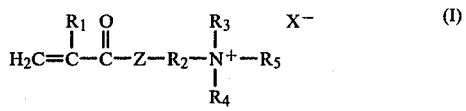

wherein $R_1$ is H or alkyl of 1 to 3 carbons; Z is N—H or O; $R_2$ is a divalent methylene radical —$(CH_2)_n$—, wherein n is from 1 to about 10; $R_3$, $R_4$ and $R_5$ can be the same or different and are alkyl or substituted alkyl, preferably of 1 to about 20 carbons or aryl or substituted aryl, preferably of 6 to about 18 carbons with the proviso that $R_3$, $R_4$ and $R_5$ cannot be hydroxy functional; and $X^-$ is an anion; and (b) from about 1 to about 20% of at least one tertiary amine containing unsaturated monomer; and (c) from about 5 to about 30% of at least one active hydrogen functional unsaturated monomer; and (d) from about 40 to about 93% of at least one other ethylenically unsaturated monomer. It is especially preferred in the practice of this invention to use a hydroxy functional monomer as the active hydrogen functional monomer.

The quaternary ammonium salt containing unsaturated monomers having the structure (I) can be prepared by many methods known in the art for producing quaternary ammonium salts from amines. They are typically prepared by reacting an unsaturated tertiary amine having the structure:

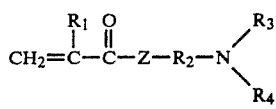

with an alkylating agent $R_5X$ under conditions producing the quaternary ammonium salt. The anion $X^-$ in the quaternary ammonium containing monomer will typically be the anion obtained by removing the alkyl groups from the alkylating agent.

The alkylating agent can be any alkylating agent which will react with the tertiary amine to produce the quaternary ammonium salt without reacting with the unsaturation or other functional groups on the tertiary amine containing monomer. Especially preferred as alkylating agents are the alkyl halides and the dialkyl sulfates. Representative examples of useful alkyl halides includes methyl chloride, ethyl bromide, n-propyl iodide, tertiary butyl chloride and benzyl chloride and the like. Preferred dialkyl sulfates include dimethyl sulfate, diethyl sulfate, and the like. The alkylation reactions typically take place readily by admixing at essentially stoichiometric amounts of the reactants under relatively mild conditions (approximately 60° C. or lower) and are usually conducted in aqueous or lower alcohol solvents.

Preferred quaternary ammonium salt-containing unsaturated monomers for the practice of this invention include:

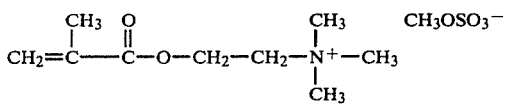

(conveniently prepared by the reaction of dimethylaminoethyl methacrylate and dimethylsulfate);

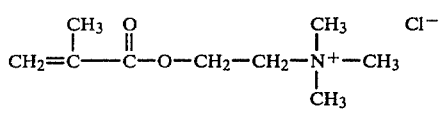

(conveniently prepared by the rection of dimethylaminoethyl methacrylate and methyl chloride);

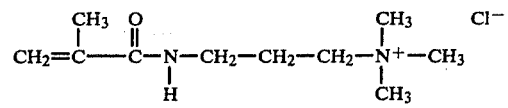

(conveniently prepared by the reaction of dimethylaminopropyl methacrylamide and methyl chloride.)

Useful active hydrogen functional unsaturated monomers include the hydroxy-functional monoesters typically prepared by the reaction of diols with unsaturated acids such as hydroxyesters of acrylic or methacrylic acid wherein the hydroxyalkyl group contains up to about 6 carbon atoms such as 2-hydroxyethyl acrylate, 2-hydroxyethyl methacrylate, 2-hydroxypropyl methacrylate, 3-hydroxypropyl acrylate, 3-hydroxypropyl methacrylate, 4-hydroxybutyl methacrylate, diethylene glycol methacrylate and so forth. Corresponding esters of other unsaturated acids, for example, crotonic acid, maleic acid, and similar acids of up to about 6 carbon atoms can also be employed. Also useful as active hydrogen functional unsaturated monomers are the ethylenically unsaturated amides such as acrylamide, methacrylamide, and other similar materials.

If desired, primary or secondary amine functionality can also be incorporated as active hydrogen functionality into the acrylic polymer. Primary or secondary amines will impart a cationic charge to the polymer when neutralized by an acid and, by virtue of their active hydrogens, also become a site for accepting crosslinks when the coating containing the blocked isocyanate is cured.

Typical primary and secondary amine compounds which can be incorporated into the acrylic polymers include amine-containing esters of monofunctional unsaturated acids of the formula:

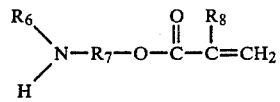

wherein $R_6$ is hydrogen, alkyl of 1 to about 10 carbon atoms, or aryl of 6 to about 12 carbon atoms; $R_7$ is —$(CH_2)_n$— with n having a value of about 1 to 6; and $R_8$ is hydrogen or an alkyl group of from 1 to about 3 carbon atoms. Examples of such materials include acrylic or methacrylic esters of alcohols having pendant primary or secondary amines such as the esters of ethanol amine, t-butylamino ethanol, and the like.

Useful tertiary amine containing unsaturated monomers include the acrylates, such as 2-(N,N-dimethylamino)ethylacrylate, 2-(N,N-diethylamino)ethylacrylate, 2-(N,N-dimethylamino)propylacrylate and the like; the methacrylates such as 2-(N,N-dimethylamino)ethylmethacrylate, 2-(N,N-diethylamino)ethylmethacrylate and the like; the acrylamides, such as 2-(N,N-dimethylamino)ethylacrylamide and 2-(N,N-dimethlyamino)ethylmethacrylamide and the like; vinyl compounds such as N-vinyl piperidine and the like.

When the acrylic polymer contains primary, secondary or tertiary amine groups, these groups can be, if desired, neutralized with acid to provide additional water solubility and to facilitate deposition upon the cathode during cathodic electrodeposition. The total amount of quaternary ammonium salt and/or neutralized amine need only be sufficient to provide water dispersibility to the polymer. If it is desired to neutralize some of the primary, secondary or tertiary amine groups in the polymer this can be readily accomplished by reacting all or part of the amino groups with an acid such acetic acid, lactic acid, phosphoric acid, formic acid, citric acid or the like.

Other useful ethylenically unsaturated monomers include those which are substantially free of tertiary amine or quaternary ammonium salt functionality. These include the unsaturated hydrocarbons such as isoprene, butadiene, ethylene, styrene, substituted styrenes, etc.; vinyl compounds such as vinyl toluene, vinyl acetate, vinyl chloride, etc; esters of unsaturated acids such as butyl acrylate, butyl methacrylate, methyl methacrylate, isobutyl methacrylate, and so forth.

The blocked isocyanates which may be employed in this invention may be any isocyanate where the isocyanate groups have been reacted with a compound so that the resultant blocked isocyanate is stable in the presence of the water reducible acrylic polymer at room temperature but is reactive with the acrylic polymer at elevated temperatures, usually between about 150° F. and about 600° F. The blocked polyisocyanate will typically be at a level of about 0.3 to about 3.0 equivalents of isocyanate for each equivalent of active hydrogen.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 3-isocyanatomethyl-3,5,5-trimethylcyclohexylisocyanate, and the 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chloro-diphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'tetraisocyanate; the polymerized polyisocyanates such as tolylene diisocyanate dimers and trimers, and other various polyisocyanates containing biuret linkages and/or allophanate linkages.

The blocked isocyanate may also be a prepolymer prepared by reacting a partially blocked isocyanate with an active hydrogen containing molecule. For instance, the prepolymer may be derived from a polyol including polyether polyols, or polyester polyols, which are reacted with excess partially blocked polyisocyanates. In this procedure, a less than stoichiometric amount of blocking agent is added to a polyfunctional isocyanate thereby blocking some but not all of the isocyanate groups available. The remaining isocyanate groups can then be reacted with a compound containing at least two active hydrogens to prepare the prepolymer.

As the blocking agent, any of the blocking agents known in the art may be used in the practice of this invention. Typical examples of them are phenol types (e.g. phenol, cresol, xylenol, nitrophenol, chlorophenol, ethyl phenol, t-butylphenol, hydroxy benzoic acid, hydroxy benzoic acid esters, 2,5-di-t-butyl-4-hydroxy toluene, etc.), lactam types (e.g. ε-caprolactam, δ-valerolactam, γ-butyrolactam, β-propiolactam, etc.), active methylene types (e.g. diethyl malonate, dimethyl malonate, ethyl acetoacetate, methyl acetoacetate, acetyl acetone, etc.), alcohol types (e.g. methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrine, ethylene bromhydrine, 1,3-dichloro-2-propanol, acetocyanhydrine, etc.), mercaptan types (e.g. butyl mercaptan, hexyl mercaptan, t-butyl mercaptan, t-dodecyl mercaptan, 2-mercapto-benzothiazole, thiophenol, methyl thiophenol, ethyl thiophenol, etc.), acid amide types (e.g. acetoanilide, acetoanisidine amide, acrylamide, methacrylamide, acetic amide, stearic amide, benzamide, etc.), imide types (e.g. succinimide, phthalimide, maleimide, etc.), amine types (e.g. diphenylamine, phenylnaphthylamine, xylidine, N-phenyl xylidine, carbazole, aniline, naphthylamine, butylamine, dibutylamine, butyl phenylamine, etc.), imidazole types (e.g. imidazole, 2-ethylimidazole, etc.), urea types (e.g. urea, thiourea, ethylene urea, ethylene thiourea, 1,3-diphenyl urea, etc.), carbamate types (e.g. N-phenyl carbamic acid phenyl ester, 2-oxazolidone, etc.), imine types (e.g. ethylene imine, etc.), oxime types (e.g. formaldoxime, acetaldoxime, acetoxime, methylethyl ketoxime, diacetylmonoxime, benzophenonoxime, chlorohexanonoxime, etc.), sulfurous acid salt types (e.g. sodium bisulfite, potassium bisulfite, etc.), and hydroxamic acid ester or acyl hydroxamate types (e.g. benzyl methacrylo hydroxamate (BMH), allyl methacrylohydroxamate, etc.). The preparation and use of hydroxamic acid ester or acyl hydroxamates as blocking agents is thoroughly disclosed in U.S. Pat. No. 4,008,192 issued to Mijs et al, the teaching of which is hereby incorporated by reference.

Among the possible blocking agents, it is especially preferred to use the lactam types, the active methylene types, the oxime types, and the hydroxamic acid ester or acyl hydroxamate type blocking agents.

The blocked isocyanates are typically prepared by mixing the isocyanate and the blocking agent while maintaining the temperature between about 50° to about 230° F.

The coating of this invention comprising the acrylic polymer and the blocked isocyanate can be dispersed in water and, usually, in combination with a water-miscible solvent. The concentration of the coating in water depends upon the process parameters to be used and is in general not critical, but in the case of electrodeposition, the major proportion of the aqueous composition will normally be water, e.g., the composition may contain about 1 to about 75% and typically 1 to about 50% by weight solid coating with the remainder being water.

The coating of this invention may be applied by any means, including electrodeposition, spray, flow coating, curtain coating, roller coating, dipping, brushing, or other method known in the art.

In most instances, a pigment composition and, if desired, various additives such as catalysts, flow agents, dispersants, solvents, and other materials may be included in the coating composition. The pigment composition may be of any conventional type, comprising, for example, one or more pigments such as iron oxides, lead oxides, strontium chromate, carbon black, titanium dioxide, talc, barium sulfate, zinc oxide, cadmium yellow, cadmium red, chromic yellow and the like.

In electrodeposition processes employing the aqueous coating composition described herein, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. The applied voltage may be varied greatly within the practice of this invention for electrodeposition and can be, for example, as low as 1 volt or as high as several thousand volts, although typically between 50 volts and 500 volts. The current density is usually between 1 ampere and 15 amperes per square foot, and tends to decrease during electrodeposition.

The electrodeposition method is applicable to the coating of any electrically conductive substrate, and especially metal such as steel, aluminum, copper, or surfaces which have been coated with conductive pigments or filaments to impart a conductive surface.

After application by whatever means desired, the coating is cured at elevated temperatures by any convenient method such as in baking ovens or with banks of infared heat lamps. Curing temperatures are preferrably from about 150° F. to about 450° F. although somewhat higher or lower temperatures can be employed if desired.

The following examples have been selected to illustrate specific embodiments and practices of advantage to a more complete understanding of the invention. Unless otherwise stated, "parts" means parts by weight.

EXAMPLE 1

Preparation of Blocked Isocyanate Prepolymer.

A four necked flask equipped with Friedricks condenser, calcium chloride drying tube, mechanical stirrer, nitrogen gas inlet, and heating mantle was charged with 729.5 parts benzylmethacrylo hydroxamate (BMH) (prepared as described in U.S. Pat. No. 4,008,192, column 6, lines 28–56) and heated to 180° F. until the BMH melted. To the molten BMH was added 626 parts Hylene ® W (saturated version of methylene di-para-phenylene isocyanate sold by E. I. duPont) and 600 parts n-methyl pyrrolidinone over a 2 hour period. The reaction mixture was maintained at 180° F. for an additional 2 hours. The temperature was then reduced to 130° F. and 9.5 parts dibutyl tin dilaurate was added to the reaction mixture. The reaction mixture was held at 130° F. until infrared analysis indicated a constant isocyanate level. 43 parts of trimethyol propane was gradually added to the reaction mixture over a 2 hour period. The reaction mixture was held at this temperature until infrared analysis indicated that essentially all of the isocyanate was reacted. The BMH-blocked isocyanate prepolymer product was a 70.12 percent weight solids solution in the n-methyl pyrrolidinone solvent.

EXAMPLE 2

Preparation of Quaternary Ammonium Salt Containing Acrylic Vehicle

A reaction vessel equipped with stirrer, condenser, and 2 addition dropping funnels was charged with 250 parts 2-butoxy ethanol and heated to 250° F. A mixture of 179 parts styrene; 42.9 parts butyl acrylate; 190 parts hydroxyethyl acrylate; 95 parts dimethylaminoethyl methacrylate; and 15 parts Vazo 64, 2,2'-azobis-(isobutyronitrile) free radical initiator manufactured by E. I. du Pont was placed in one of the dropping funnels. The other dropping funnel was charged with 43.8 parts of a 80% aqueous solution of Sipomer ®Q5-80 (quaternization product of dimethylaminoethyl methacrylate and dimethyl sulfate sold by Alcolac Inc.).

The contents of the 2 addition dropping funnels were added simultaneously to the heated solvent over about a 3 hour period. The mixture was maintained at 250° for about 15 minutes and then a solution of 3.8 parts 2-butoxy ethanol and 1.9 parts Vazo 64 was added to the reaction mixture in 4 separate additions each 15 minutes apart. The reaction mixture was held at 250° for approximately 3 hours and then the reaction vessel was attached to a Dean-Stark trap to remove the water. The acrylic vehicle produced by this reaction was approximately 74% weight solids.

EXAMPLES 3

Following the procedure of Example 2 an acrylic vehicle was prepared having a weight percent solids composition of 44.5% butyl acrylate; 24.7% styrene; 19.8% hydroxyethyl acrylate; 7.8% dimethylaminoethyl methacrylate; and 3% methacrylamidopropyl-trimethylammonium chloride (marketed as MAPTAC by Texaco Chemical Company).

In order to test pigmented formulations a grind paste was prepared by mixing on a laboratory mill:

GRIND PASTE blocked isocyanate from Example 1: 596.75 parts
furnace black: 121.55 parts Representative examples of coating formulations useful in cathodic electrodeposition are described in Examples 4 and 5.

EXAMPLE 4

An aqueous coating was prepared by mixing the following ingredients:
Grind Paste: 54.4 parts
acrylic vehicle from Example 2: 153.4 parts
blocked isocyanate from Example 1: 63.0 parts
lactic acid: 2.5 parts
2-ethoxyethyl acetate: 10.0 parts
distilled water: 1,716 parts This coating was electrodeposited on a zinc phosphate panel cathode using a voltage of 150 volts for one minute. The panel was baked at 220° F. for 30 minutes to provide a hard, solvent resistant finish.

EXAMPLE 5

A cathodically electrodepositable coating was prepared by mixing:
Grind Paste: 54.5 parts
acrylic resin from Example 3: 160.9 parts
blocked isocyanate Cross-linker from Example 1: 153.0 parts lactic acid: 2.5 parts
2-ethoxyethyl acetate: 10.0 parts
deionized water: 1716.0 parts.

A zinc phosphate treated steel panel used as the cathode was electrodeposited with this coating for 60 seconds at 40 volts, rinsed with water and baked 30 minutes at 220° F. to yield a hard, solvent resistant finish.

While this invention has been described by a number of specific embodiments, it is obvious that other variations and modifications may be made without departing from the spirit and scope of the invention as set forth in the appended claims.

The invention claimed is:

1. A water dispersible coating composition which comprises:
   (i) an acrylic polymer which comprises the free radical addition product of: (a) at least one quaternary ammonium salt containing unsaturated monomer having the structure:

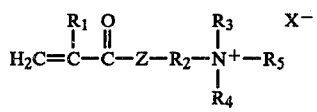

wherein $R_1$ is H or alkyl of 1 to 3 carbons; Z is N—H or O; $R_2$ is a divalent methylene radical —$(CH_2)_n$— wherein n is from 1 to about 10; $R_3$, $R_4$ and $R_5$ can be the same or different and are alkyl, substituted alkyl, aryl or substituted aryl, with the proviso that $R_3$, $R_4$ and $R_5$ cannot be hydroxy functional; and $X^-$ is an anion; and (b) at least one active hydrogen functional unsaturated monomer; and (c) at least one other ethylenically unsaturated monomer; and
   (ii) a blocked polyisocyanate which is stable in the presence of the acrylic polymer at room temperature but reactive with the acrylic polymer at elevated temperatures.

2. The composition of claim 1 further characterized in that the active hydrogen containing monomer is a hydroxy functional monomer.

3. The composition of claim 1 further characterized in that the acrylic polymer contains styrene.

4. The composition of claim 1 further characterized in that the blocked polyisocyanate is present at a level of about 0.3 to about 3.0 equivalents of isocyanate for each equivalent of active hydrogen.

5. The composition of claim 1 further characterized in that the blocked polyisocyanate is the reaction product of an organic polyisocyanate and a blocking agent selected from the group consisting of oximes, lactams, hydroxamic acid esters, and active methylene blocking agents.

6. The composition of claim 5 further characterized in that the blocking agent is benzylmethyacrylohydroxamate.

7. The composition of claim 1 further characterized in that the quaternary ammonium salt containing monomer is:

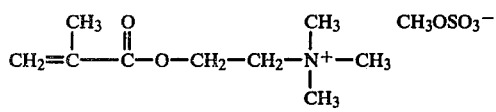

8. The composition of claim 1 further characterized in that the quaternary ammonium salt containing monomer is:

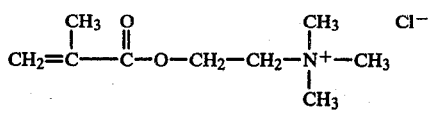

9. The composition of claim 1 further characterized in that the quaternary ammonium salt containing monomer is:

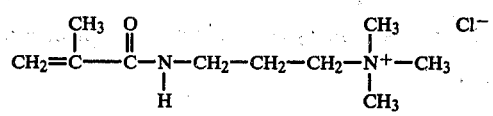

10. A water dispersible coating composition which comprises:
    (i) an acrylic polymer which comprises the free radical addition product of: (a) from about 1 to about 10 percent of at least one quaternary ammonium salt containing unsaturated monomer having the structure:

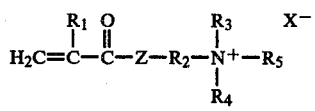

wherein $R_1$ is H or alkyl of 1 to 3 carbons; Z is N—H or O; $R_2$ is a divalent methylene radical —$(CH_2)_n$— wherein n is from 1 to about 10; $R_3$, $R_4$, and $R_5$ can be the same or different and are alkyl, substituted alkyl, aryl or substituted aryl, with the proviso that $R_3$, $R_4$ and $R_5$ cannot be hydroxy functional; and $X^-$ is an anion; and (b) from about 1 to about 20 percent of at least one tertiary amine containing unsaturated monomer; and (c) from about 5 to about 30 percent of at least one active hydrogen functional unsaturated monomer; and (d) from about 40 to about 93 percent of at least one other ethylenically unsaturated monomer; and
    (ii) a blocked polyisocyanate which is stable in the presence of the acrylic polymer at room temperature but reactive with the acrylic polymer at elevated temperatures.

11. The composition of claim 10 further characterized in that the active hydrogen containing monomer is a hydroxy functional monomer.

12. The composition of claim 10 further characterized in that the acrylic polymer contains styrene.

13. The composition of claim 10 further characterized in that the blocked polyisocyanate is present at a level of about 0.3 to about 3.0 equivalents of isocyanate for each equivalent of active hydrogen.

14. The composition of claim 10 further characterized in that the blocked polyisocyanate is the reaction product of an organic polyisocyanate and a blocking agent selected from the group consisting of oximes, lactams, hydroxamic acid esters, and active methylene blocking agents.

15. The composition of claim 14 further characterized in that the blocking agent is benzylmethyacrylohydroxamate.

16. The composition of claim 10 further characterized in that the quaternary ammonium salt containing monomer is:
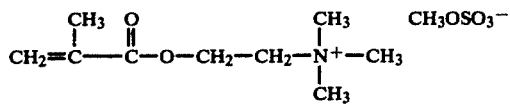
17. The composition of claim 10 further characterized in that the quaternary ammonium salt containing monomer is:
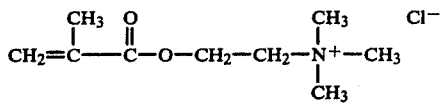
18. The composition of claim 10 further characterized in that the quaternary ammonium salt containing monomer is:
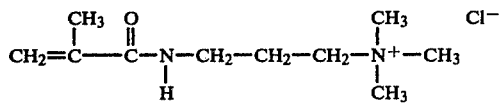
* * * * *